Patented Aug. 22, 1933

1,923,706

UNITED STATES PATENT OFFICE 1,923,706

AGE RETARDERS

Albert M. Clifford, Stow, Ohio, assignor to The Goodyear Tire & Rubber Company, Akron, Ohio, a Corporation of Ohio No Drawing. Application September 14, 1931
Serial No. 562,827

6 Claims. (Cl. 18—50)

My invention relates to methods of preserving organic materials. More particularly it relates to methods of preserving rubber, balata and similar rubber-like substances.

An object of the invention is to provide a method of treating materials of the above indicated character whereby to retard the decay and resultant loss of tensile strength and elasticity thereof, occasioned by the attacks of atmospheric oxygen, sunlight and heat. Another object is to provide a rubber product having the characteristics referred to. Other objects and advantages will become apparent from the following descriptions.

Heretofore it has been observed that certain organic substances, such as reaction products of aldol and alpha naphthylamine, hydroquinone and similar substances, when incorporated in rubber, have the effect of retarding the action of oxygen, sunlight and heat which, under ordinary circumstances, cause premature decay and degeneration of rubber materials. Although many substances having similar age retarding properties are known to the industry, most of such materials heretofore employed for this purpose are objectionable for various reasons; for example, some of them are poisonous to the workmen employed in handling them, and, therefore, in order to use them in commercial practice, it has been necessary to take great precautions to overcome these effects. Still other materials are only mildly antioxidant in their properties or are objectionable because they can not be incorporated in the rubber except by subjecting the latter to excessive milling operations or because they are too expensive for commercial application.

My invention resides in the discovery that the amino derivatives of certain of the hydrocarbons contained in that fraction of coal tar which boils between 265 to 400 degrees C., termed the methyl naphthalene or anthracene oil fraction, constitute excellent age retarders for rubber. As a specific example of a material of this class, attention is invited to amino methyl naphthalene which may be prepared by nitrating a cold solution of methyl naphthalene in acetic acid. The nitro derivatives thus obtained may conveniently be reduced to the amino compound by the addition of iron filings and hydrochloric acid or ammonium chloride. In order to separate the amino derivative from the black reaction product, it is desirable to extract the latter by means of a convenient organic solvent from which the compound may be obtained by crystallization, or by evaporation of the solvent. However, because of the fact that the 1-methyl napthalene of commerce is contaminated with considerable 2-methyl naphthalene, it is difficult to obtain from the former a pure 1-methyl mono nitro naphthalene. The crude nitration product therefrom contains 1-nitro 2-methyl naphthalene, which partially crystallizes from the mixture and may be to that extent separated by filtration, and an oily portion x-nitro y-methyl naphthalene which, in addition to x-nitro 1-methyl naphthalene, probably contains some 1-nitro 2-methyl naphthalene. As outlined above, these two portions, x-nitro y-methyl naphthalene and 1-nitro 2-methyl naphthalene, may be reduced respectively to x-amino y-methyl naphthalene, having a liquid boiling point of from 150 to 170 degrees C. at 5 millimeters pressure, and 1-amino 2-methyl naphthalene having a liquid boiling point of from 160 to 175 degrees C. at 5 millimeters pressure. References to these two substances may be found in Ann. 402, 1-51 and Beilstein II, 598.

The materials thus obtained may be added with satisfactory results to substantially any of the ordinary rubber compounds. However, the following constitute examples of such materials in which they have been found by actual experience to be particularly satisfactory.

*Formula A*

| | |
|---|---|
| Pale crepe rubber | 100 parts |
| Zinc oxide | 5 parts |
| Sulfur | 3 parts |
| Hexamethylene tetramine | 1 part |
| Stearic acid | 1.5 parts |
| Antioxidant | 1 part |

*Formula B*

| | |
|---|---|
| Smoked sheet rubber | 100 parts |
| Zinc oxide | 92.5 parts |
| Carbon black | .6 part |
| Ferric oxide | .7 part |
| Sulfur | 3.5 parts |
| Diphenylguanidine | .7 part |
| Antioxidant | 5 parts |

Two sets of test sheets in which the methyl naphthalene compounds were employed as antioxidants were prepared in accordance with each of the above formulæ. One set of test sheets prepared in accordance with Formula A was subjected to what is termed a "low temperature" accelerated age test, being placed in an oxygen bomb under a pressure of 150 pounds of oxygen per square inch and at a temperature of 50 degrees for a period of six days. At the conclusion of this period of artificial aging, the test sheets were then removed from the bomb and subjected to physical tests in order to ascertain the tensile strength and elasticity thereof.

A corresponding set of samples prepared in accordance with Formula B was subjected to what is termed a "high temperature" accelerated age test, being placed in a bomb charged with air under a pressure of 80 pounds per square inch at a temperature of 114 degrees C. for a period of 7 hours, after which the test pieces were removed from the bomb and subjected to physical tests in order to ascertain the tensile strength and elasticity thereof. The results of these tests, together with corresponding physical tests conducted upon the remaining sets of samples which were not subjected to artificial aging, but which were included for purposes of comparison, are tabulated as follows:

LOW TEMPERATURE TEST 1-amino 2-methyl naphthalene

Formula A—Original

| Cure | | Stress in kgs/cm² at | | | Elong. at break | Percent weight increase |
|---|---|---|---|---|---|---|
| Time in mins. | Temp. F° | 500% elong. | 700% elong. | Break | | |
| 35 | 285 | 11 | 35 | 112 | 900 | ---------- |
| 50 | 285 | 16 | 60 | 137 | 835 | ---------- |
| 70 | 285 | 25 | 101 | 156 | 770 | ---------- |

Aged 6 days in oxygen bomb

| 35 | 285 | 17 | 55 | 119 | 830 | ---------- |
| 50 | 285 | 24 | 89 | 130 | 765 | 0.12 |
| 70 | 285 | 32 | 126 | 155 | 740 | .01 |

HIGH TEMPERATURE TEST

Formula B—Original

| | | 300% | 500% | | | |
|---|---|---|---|---|---|---|
| 35 | 285 | 26 | 77 | 175 | 690 | ---------- |
| 50 | 285 | 31 | 90 | 195 | 675 | ---------- |
| 70 | 285 | 38 | 106 | 222 | 670 | ---------- |

Aged 7 hrs. in air bomb

| 35 | 285 | 18 | 45 | 52 | 535 | ---------- |
| 50 | 285 | 23 | 56 | 84 | 590 | ---------- |
| 70 | 285 | 30 | 75 | 102 | 575 | ---------- |

X-amino y-methyl naphthalene

LOW TEMPERATURE TEST

Formula A—Original

| | | 500% | 700% | | | |
|---|---|---|---|---|---|---|
| 35 | 285 | ---------- | ---------- | 125 | 905 | ---------- |
| 50 | 285 | ---------- | ---------- | 124 | 800 | ---------- |
| 70 | 285 | ---------- | ---------- | 158 | 760 | ---------- |

Aged 6 days in oxygen bomb

| 35 | 285 | 17 | 62 | 114 | 800 | 0.09 |
| 50 | 285 | 24 | 94 | 146 | 775 | .07 |
| 70 | 285 | 36 | 140 | 152 | 715 | .12 |

HIGH TEMPERATURE TEST

Formula B—Original

| Cure | | Stress in kgs/cm² at | | | Elong. at break | Percent weight increase |
|---|---|---|---|---|---|---|
| Time in mins. | Temp. F° | 300% elong. | 500% elong. | Break | | |
| 35 | 285 | 29 | 84 | 198 | 700 | ---------- |
| 50 | 285 | 35 | 102 | 194 | 640 | ---------- |
| 70 | 285 | 43 | 120 | 207 | 625 | ---------- |

Aged 7 hrs. in air bomb

| 35 | 285 | 16 | 37 | 56 | 605 | ---------- |
| 50 | 285 | 21 | 48 | 78 | 615 | ---------- |
| 70 | 285 | 30 | 67 | 86 | 565 | ---------- |

By comparison of the results obtained from the artificially aged test sheets and the original test sheets before aging, it will be apparent that those containing the new antioxidants resist deterioration caused by oxygen to a remarkable degree even in the cases where a temperature of 114 degrees is employed. In fact, the samples which were subjected to the low temperature age test at 50 degrees C. exhibited as good physical properties as the unaged test pieces, even after having been subjected to oxidation for a period of six days. A rubber stock containing no antioxidant, upon being subjected to similar conditions, is reduced to a resinous mass substantially void of tensile strength and elasticity.

It is to be noted that the invention is not limited to the simple amino substituted methyl naphthalenes, but also includes certain derivatives thereof; for example, such aldehyde derivatives as formaldehyde, acetaldehyde, propionaldehyde, butyraldehyde, heptaldehyde, crotonaldehyde, acrolein and aldol. It is also possible to react any of the amino methyl naphthalene compounds with the lower members of the fatty acid series, such as formic acid, or if desired, they may be reacted with a halide of an aliphatic hydrocarbon, such as butyl chloride to obtain aliphatic hydrocarbon substituted amines which are also excellent antioxidants.

These antioxidants are particularly desirable from a commercial viewpoint because the methyl naphthalene fraction constituting the basic ingredient is obtained as a coal tar by-product for which there is little use at the present time. By nitrating, reducing and further reacting these otherwise useless materials with either aldehydes, fatty acids or aliphatic hydrocarbon halides, excellent antioxidants which may be used in the manufacture of rubber are obtained. In addition to being excellent preservatives in the rubber in which they are incorporated, these antioxidants are substantially non-odorous and non-toxic, are relatively soluble in rubber and may be incorporated in that material with ease.

It is to be understood that the methyl naphthalenes used in my invention are not limited to those found in the coal tar fraction mentioned, but those found in any other source may be used also.

Although I have illustrated only the preferred forms of the invention, it will be apparent to those skilled in the art that the invention is not so limited but that various modifications may be made therein without departing from the spirit of the invention or from the scope of the appended claims. It is intended that the patent shall cover, by suitable expression in the appended claims, whatever features of patentable novelty reside in the invention.

What I claim is:

1. A method of preserving rubber which comprises subjecting it to vulcanization in the presence of a primary amino methyl naphthalene.

2. A method of preserving rubber which comprises subjecting it to vulcanization in the presence of 1-amino 2-methyl naphthalene.

3. A rubber product that has been vulcanized in the presence of a primary amino methyl naphthalene.

4. A rubber product that has been vulcanized in the presence of 1-amino 2-methyl naphthalene.

5. A rubber product that has been vulcanized in the presence of x-amino y-methyl naphthalene having a liquid boiling point of from 150 to 170 degrees C. at 5 millimeters pressure obtained by reducing the oily x-nitro y-methyl naphthalene obtained by nitrating methyl naphthalene.

6. A method of preserving rubber which comprises subjecting it to vulcanization in the presence of x-amino y-methyl naphthalene having a liquid boiling point of from 150 to 170 degrees C. at 5 millimeters pressure obtained by reducing the oily x-nitro y-methyl naphthalene obtained by the nitration of methyl naphthalene.

ALBERT M. CLIFFORD.